US006816082B1

(12) United States Patent
Laborde

(10) Patent No.: US 6,816,082 B1
(45) Date of Patent: Nov. 9, 2004

(54) COMMUNICATIONS SYSTEM HAVING REDUNDANT CHANNELS

(75) Inventor: Guy Vachon Laborde, Austin, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 845 days.

(21) Appl. No.: 09/193,444

(22) Filed: Nov. 17, 1998

(51) Int. Cl.[7] .................................................. G01V 3/00
(52) U.S. Cl. ............................. 340/853.3; 340/854.9; 340/853.2; 370/225; 370/228; 370/248
(58) Field of Search .......................... 340/854.9, 853.3, 340/853.2; 370/225, 228, 248

(56) References Cited

U.S. PATENT DOCUMENTS

| | | | | |
|---|---|---|---|---|
| 4,633,246 A | * | 12/1986 | Jones | 370/228 |
| 4,868,561 A | | 9/1989 | Davis | 340/825.44 |
| 4,956,835 A | * | 9/1990 | Grover | 370/228 |
| 4,992,790 A | | 2/1991 | Montgomery | 341/70 |
| 5,159,595 A | * | 10/1992 | Flanagan | 370/228 |
| 5,191,326 A | | 3/1993 | Montgomery | 340/855.5 |
| 5,253,271 A | | 10/1993 | Montgomery | 375/295 |
| 5,331,318 A | | 7/1994 | Montgomery | 340/855.4 |
| 5,333,130 A | * | 7/1994 | Weissman | 370/228 |
| 5,341,364 A | * | 8/1994 | Mara | 370/228 |
| 5,365,511 A | | 11/1994 | Kusano | 370/220 |
| 5,412,652 A | * | 5/1995 | Lu | 370/228 |
| 5,515,038 A | | 5/1996 | Smith | |
| 5,613,935 A | | 3/1997 | Jarvik | 600/16 |
| 5,781,530 A | | 7/1998 | Segal | 370/244 |
| 5,793,746 A | * | 8/1998 | Gerstel et al. | 370/228 |
| 5,835,482 A | * | 11/1998 | Allen | 370/225 |
| 5,859,959 A | * | 1/1999 | Kimball | 395/182.02 |
| 5,959,547 A | * | 9/1999 | Tubel | 340/853.2 |

FOREIGN PATENT DOCUMENTS

| | | |
|---|---|---|
| EP | 0 682 431 A1 | 9/1994 |
| GB | 2 082 062 A | 2/1980 |
| WO | WO 98/07049 | 2/1998 |

OTHER PUBLICATIONS

U.S. patent application Ser. No. 07/657,225, filed Feb. 15, 1991, entitled "Method and Apparatus For Transmitting and Receiving Digital Data Over A Bandpass Channel," By Michael A. Montgomery, Jimmy E. Neeley, David L. Lyon and Chanchai Poonpol.

Neil Douglas et al., "Risk & Reliability Considerations For The Intelligent Well," Paper for Petroleum Series 1998, Conference Aberdeen, Scotland, pp. 1–25 (Sep. 22–24, 1998).

Schlumberger Oilfield Services, Wireline & Testing, "Intelligent Testing Systems," pp. 1–4, Published at http://www.schlumberger.com/oilf/w_t/ (1996).

CRC Press, "The Electrical Engineering Handbook," pp. 1465–1466 (1993).

* cited by examiner

Primary Examiner—Albert K. Wong
(74) Attorney, Agent, or Firm—Trop, Pruner & Hu P.C.; Jeffrey Griffin; Brigitte Jeffery Echols

(57) ABSTRACT

A system for use in a well having completion zones includes a surface node and a plurality of downhole nodes positioned in the completion zones. A communications link extends into the well and is coupled to the surface node and downhole nodes. The communications link includes channels coupling successive nodes, and the surface node and downhole nodes are coupled in a loop by the channels.

26 Claims, 7 Drawing Sheets

US 6,816,082 B1

COMMUNICATIONS SYSTEM HAVING REDUNDANT CHANNELS

BACKGROUND

The invention relates to communications systems having redundant channels used in wells.

After a wellbore has been drilled, various completion operations may be performed in the wellbore, in which equipment including packers, valves, flow tubes, and other devices may be set to control fluid production from one or more zones in the well. With advances in technology, sensing and control devices may be placed downhole to monitor and to adjust equipment settings as needed.

A system that monitors downhole conditions may include various downhole gauges and sensors that are capable of monitoring temperature, pressure, and flow information. Using a communications link, such as an acoustic data link or a digital telemetry link, data gathered by the gauges and sensors may be sent to the surface to control boxes. The data may then be processed to determine conditions downhole so that production may be improved and potential reservoir problems may be avoided. In addition to gauges and sensors, downhole systems may include control devices capable of receiving commands from the surface for controlling equipment settings downhole.

To communicate information to the surface and to transmit commands downhole, a communications link may be coupled to multiple nodes positioned at various depths and in different completion zones. Because of the long lengths of a communications link in a well (typically thousands of feet to tens of thousands of feet long) and the relatively harsh environment downhole, portions of the communications link may be subject to failure. Failures may include, as examples, mechanical breakage of a portion of the communications link, shorting of electrical conductors in the link, or other types of failures. Further, the nodes themselves may fail, which may prevent communication to other nodes in the well. Failure of nodes may be caused by loss of power or well fluid flooding, for example.

Communications systems have included redundant communications links to provide some fault tolerance. In one conventional system, two channels are coupled between successive nodes. If one channel fails, the other takes over. However, with this scheme, failure of a node may prevent further communication to downstream nodes from the surface. Thus, a need exists for communications systems with improved fault tolerance.

SUMMARY

In general, according to one embodiment, a communications system in a well having downhole nodes coupled by a communications link is set up. Existence of a node failure is determined, and if so, an alternate route is identified in the communications link around the failed node.

Other features will become apparent from the following description and from the claims.

DETAILED DESCRIPTION

Figure 1:
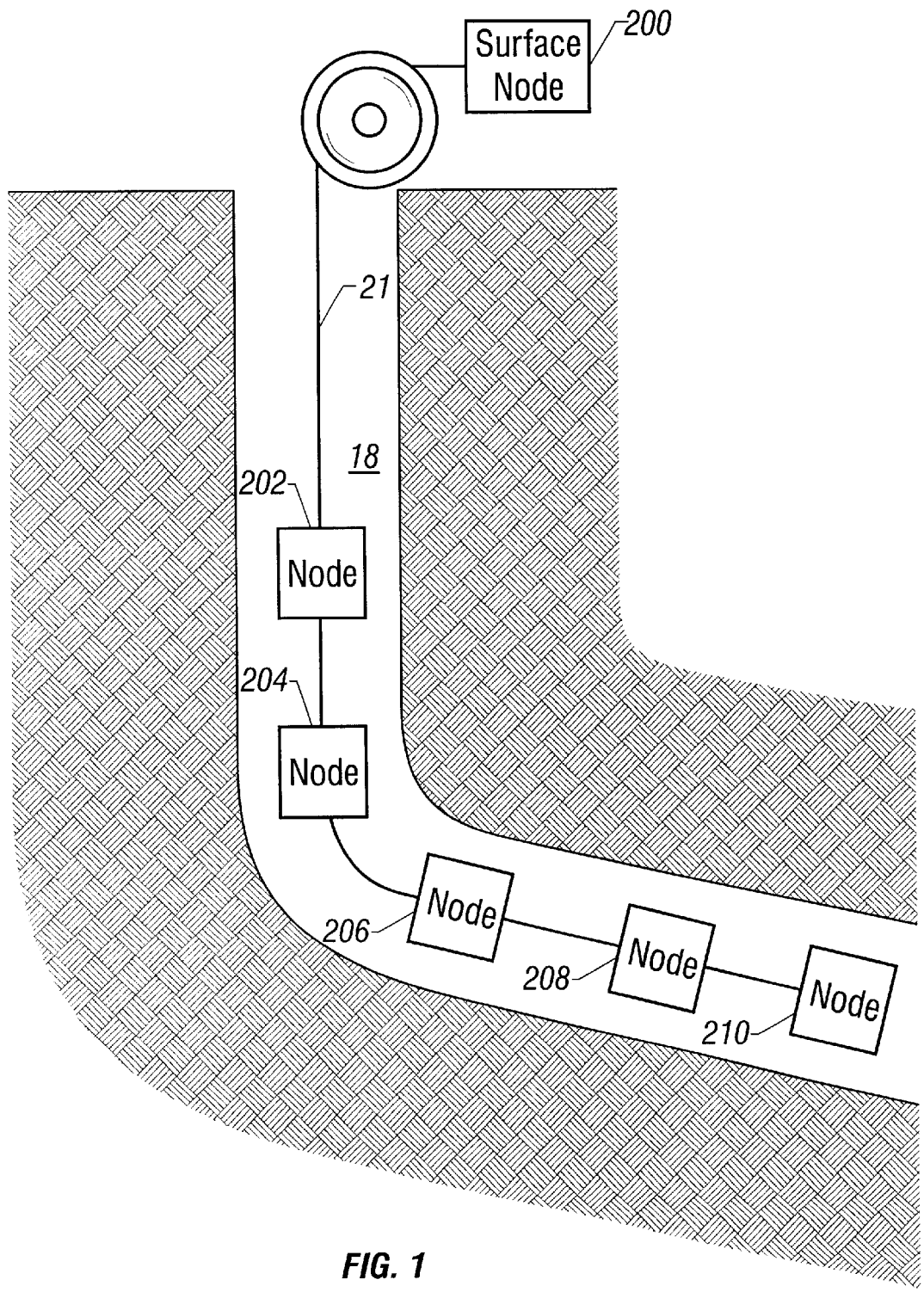
FIG. 1 is a block diagram of a system in a well having multiple nodes coupled over a communications link.

Referring to FIG. 1, in an example communications system according to an embodiment of the invention for use with a well 18, a surface node 200 may be coupled to multiple downhole nodes in the well 18, illustrated as five nodes 202, 204, 206, 208, and 210. The communications link 21 coupling nodes 200, 202, 204, 206, 208, and 210 has one or more redundant channels according to embodiments of the invention. If a link portion downhole fails, communication may still be possible among the nodes along redundant channels. If a node downhole fails, communication among the remaining nodes along alternate communication paths may also be possible.

The well 18 may be a vertical or deviated well with one or more completion zones, or it may be a multilateral well. In some embodiments, the nodes may include various types of control devices, including general-purpose or special-purpose computers, or any other controller-based system in which the controller may include a microprocessor, microcontroller, application specific integrated circuit (ASIC), programmable gate array (PGA), or other control devices, whether integrated or discrete. Alternatively, some or all of the nodes may be devices that do not include control devices but do include transmitters to communicate information acquired from sensors and gauges to the surface.

The nodes located in the wellbore may be coupled to sensing devices (e.g., temperature and pressure sensors or gauges) and other well equipment. Data may be acquired by the sensing devices and transferred to the downhole nodes for transmission up the communications link 21. In addition, the downhole nodes may be coupled to well equipment, such as valves, flow control devices, and packers that are actuatable to different settings. Control signals may be sent from the surface node 200 to the downhole nodes to adjust settings of certain well equipment, including for example valves, packers, and so forth. In some example applications, the well equipment and nodes may form part of an intelligent completions system or a permanent monitoring system.

The nodes coupled to the communications link 21 each may include communications interface circuitry, for example, modems. In some embodiments, signals may be transmitted over the communications link 21 according to any one of various types of protocols. An example protocol is the ModBus Protocol, available at {http://www.modicon.com/techpubs}, which defines a serial communications link. However, any number of other communications protocols may also be used with embodiments of the invention. The communications link 21 may be, for example, a wireline having one or more electrical conductors. Alternatively, the link 21 may be provided down through a coiled tubing.

The link 21 may include a single electrical conductor to carry both power and signals, or alternatively, it may include a separate power conductor and one or more separate signal conductors. If a common line is used to carry both power and data, the DC component on the line is the power voltage while an AC component constitutes a data signal.

According to embodiments of the invention, redundancy included in the communications link 21 may allow continued operation despite some failures of one or more parts of the communications system. Parts that may fail include portions of the communications link itself, e.g., due to mechanical breakage, shorting of electrical conductors, or other types of failures. Another source of failure downhole may be the nodes themselves, which may occur because of power loss or well fluid flooding.

Figure 2A:
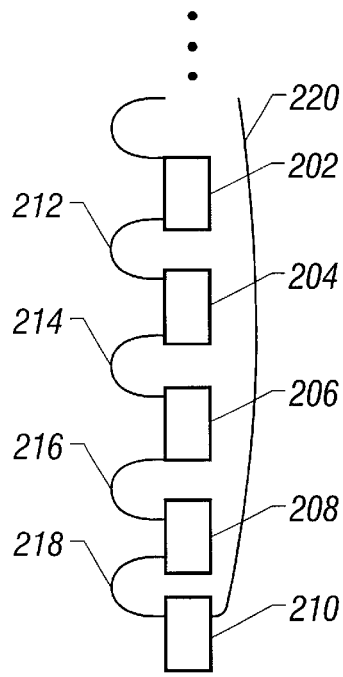
FIGS. 2A–2B illustrate a communications systems according to one embodiment having redundant communications links.
Figure 2B:
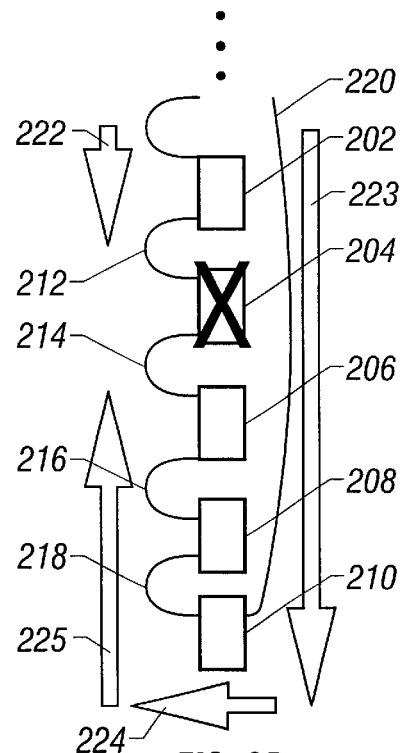

Inter-coupling schemes according to embodiments of the invention provide redundancy to reduce the likelihood of system failure should a component downhole fail. In the ensuing description, portions of the communications link that couple any two nodes are referred to as channels. Referring to FIGS. 2A–2B, one illustrative configuration of how elements in a communications system containing redundant channels may be inter-coupled is shown. In FIG. 2A, the communications system includes five nodes 202, 204, 206, 208, and 210 coupled in a loop by corresponding channels. A channel 212 couples nodes 202 and 204, a channel 214 couples nodes 204 and 206, a channel 216 couples nodes 206 and 208, and a channel 218 couples nodes 208 and 210. As redundancy, a further channel 220 couples the bottom node 210 to another node upstream, which may be a surface device, for example.

The communications system as illustrated may withstand failures of one or more of the nodes 202–210 or one or more of the channels 212–220. For example, in FIG. 2B, failure of the node 204 is illustrated. Because of the failed node 204, communication from node 202 to node 206 over channels 212, 214 is not possible. However, because of the presence of the redundant channel 220, an alternative path is provided from nodes above the failed node 204 to nodes 206, 208, and 210. The possible communication paths are illustrated by arrows 222, 223, 224, and 225.

Power to the nodes 202–210 are provided through each of the channels 212, 214, 216, 218, and 220. If any channel is cut off due to failure, power may be provided over an alternative path. In the example of FIG. 2B, power to the nodes 206, 208, and 210 are provide from another direction over the channel 220 after the node 204 is detected as a failed node.

Figure 3:
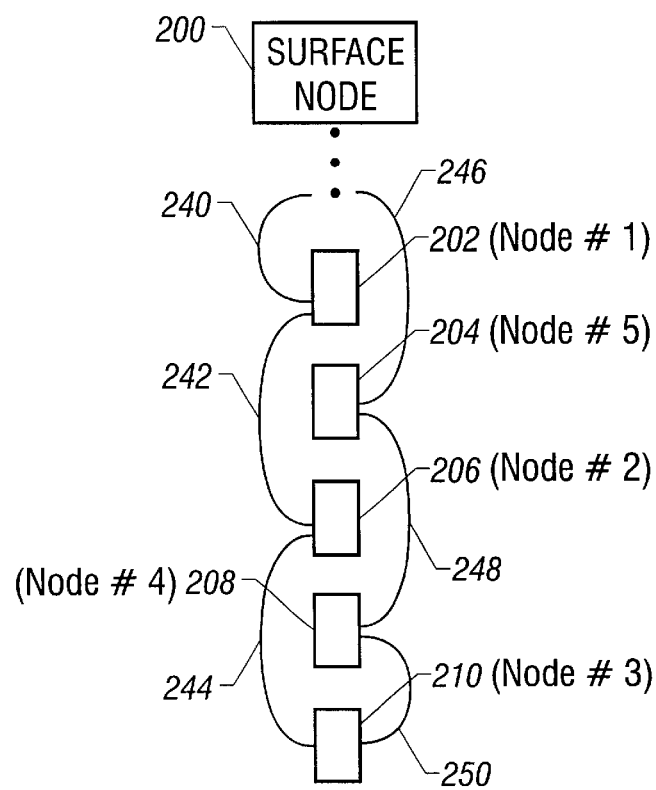
FIG. 3 illustrates a communications system according to another embodiment having redundant communications links.

Referring to FIG. 3, according to another embodiment, channels couple every other node to remove the need for a long channel 220 as shown in FIG. 2A from the bottom node 210 to an upstream node as illustrated in FIG. 2A. In the topology of FIG. 3, a channel 240 couples an upstream device (e.g., the surface node 200) to the node 202. Although the nodes 202–210 are physically positioned in sequence in a well, the order of communications may be different. For example, a loop containing the surface node 200 and the nodes 202–210 may be coupled in the following sequence: surface node 200, node 202, node 206, node 210, node 208, node 204, and surface node 200. A channel 240 couples nodes 200 and 202, a channel 242 couples nodes 202 and 206, a channel 244 couples nodes 206 and 210, a channel 250 couples nodes 210 and 208, a channel 248 couples nodes 208 and 204, and a channel 246 couples nodes 204 and 200. As illustrated, intermediate nodes may be bypassed by communications channels to couple nodes on either side of the intermediate nodes. In FIG. 3, channel 242 bypasses node 204 to couple nodes 202 and 206, and so forth. As coupled to the communications link 21 in FIG. 3, node 202 is node #1, node 206 is node #2, node 210 is node #3, node 208 is node #4, and node 204 is node #5. In alternative embodiments, channels may bypass more than one intermediate node. With a topology as illustrated in FIG. 3 or some other similar topology, the length of channels between downhole nodes and the surface node 200 may be shortened to reduce the likelihood of coupling failure.

In addition to communicating signals among the nodes, the channels 240, 242, 244, 246, 248, and 250 also communicate power to the nodes. A failure in a particular path would cause power to be cut off along that path; however, power can be routed to the affected nodes along an alternative path. For example, if channel 242 becomes unavailable due to some failure, power to node 206 will be cut off from above. However, because channels 246, 248, 250 and 244 are available, power can be provided from below the node 206 over those channels.

Figure 4:
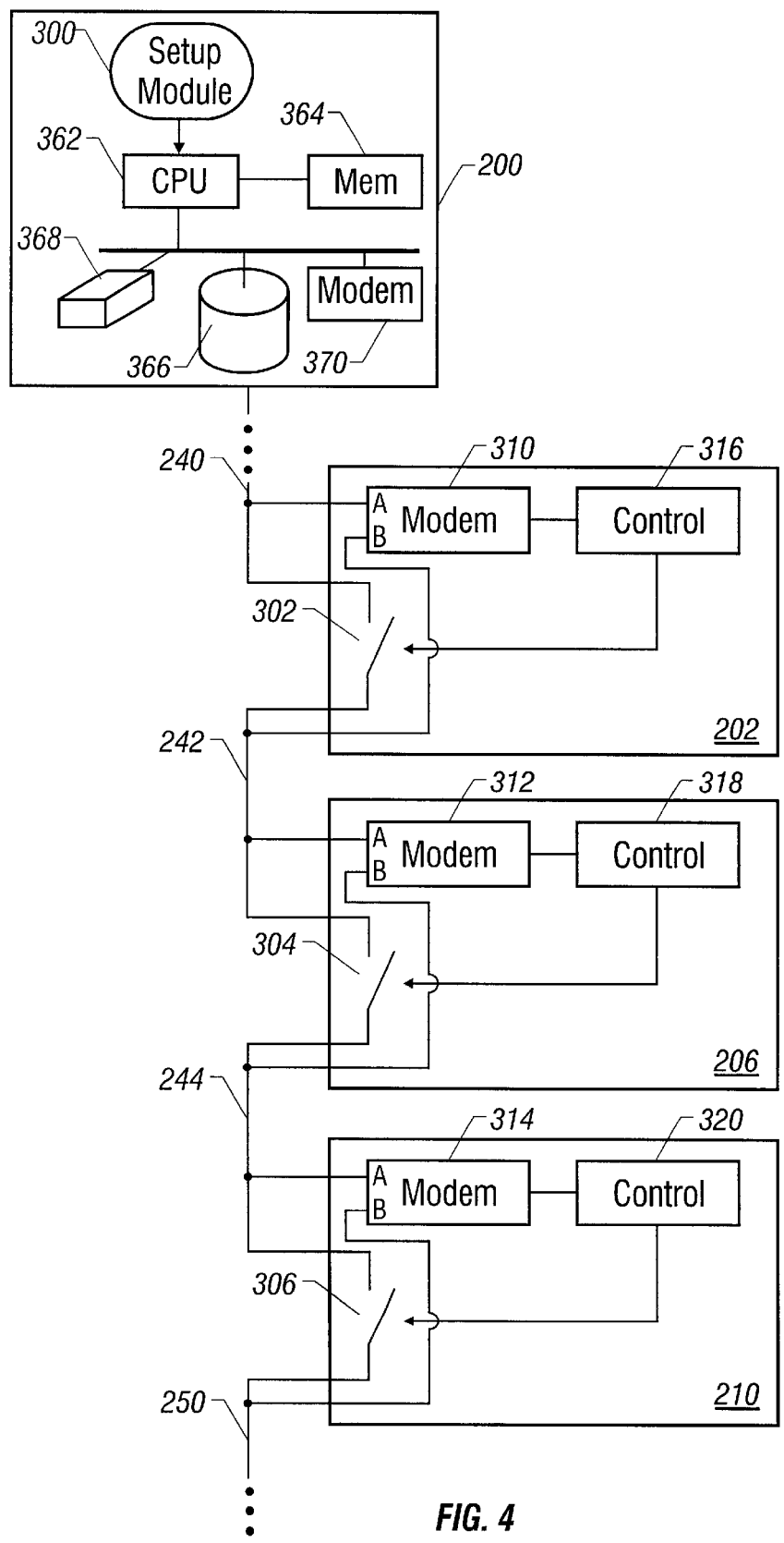
FIG. 4 is a diagram of a portion of the communications system of FIG. 3 including control and interface circuitry according to one embodiment.

Each of the nodes includes interface circuitry coupled to the communications channels. The interface circuitry may include a modem having a transmitter and receiver to transmit and receive signals over the channels. As illustrated in FIG. 4, the nodes 202, 206, and 210 include modems 310, 312, and 316, respectively, having first ports A coupled to channels 240, 242, and 244, respectively. The second ports B of the modems 310, 312, and 314 are coupled to channels 242, 244, and 250 respectively. Thus, each modem has a first port A to listen to a channel above and a port B to listen to a channel below. Also, in case of failure, the downhole nodes are coupled to receive power either from above or below over the channels.

The nodes 202, 206, and 210 further include control devices 316, 318, and 320 that are coupled to respective modems to process received data or to generate data for transmission. The control devices may be in the form of microprocessors, microcontrollers, ASICs, PGAs, discrete devices, and the like. The other downhole nodes may be similarly constructed.

The interface circuitry of each node may also include an isolation switch to isolate successive channels. The switches may be solid-state switches, relay switches, or the like. As illustrated, an isolation switch 302 is actuatable by the control device 316 in the node 202 to an open or close position to selectively couple channel 240 to channel 242. Similarly, an isolation switch 304 in the node 206 is actuatable by the control device 318 to selectively couple channels 242 and 244, and an isolation switch 306 in the node 210 is actuatable by the control device 320 to selectively couple channels 244 and 250. The other nodes may also contain isolation switches arranged in similar fashion.

As illustrated, each modem can monitor a channel above the node with port A and a channel above the node with port B before the associated isolation switch is closed.

When a failure occurs, it may be desirable to isolate the failed elements or channels. The switches 302, 304, and 306 may be adapted to power up in the open position. Thus, for example, if a channel or node is shorted so that communication is disabled, the isolation switches can isolate the defect from the rest of the system. For example, if a short on the channel 242 is detected, then the switches 302 and 304 may be kept open to avoid the short on channel 242 causing failures in neighboring nodes or channels. During system initialization, the switches in the nodes may be successively closed if a test sequence verifies that defects are not present. Switches adjacent defective channels or nodes may be kept open to isolate the defective channels or nodes.

In further embodiments that provide added redundancy, a pair of channels may be coupled between any two nodes. Thus, if one channel in the pair fails, the other one of the pair may be utilized. If both channels fail, then a redundant path may be identified to communicate to the other nodes.

Figure 5:
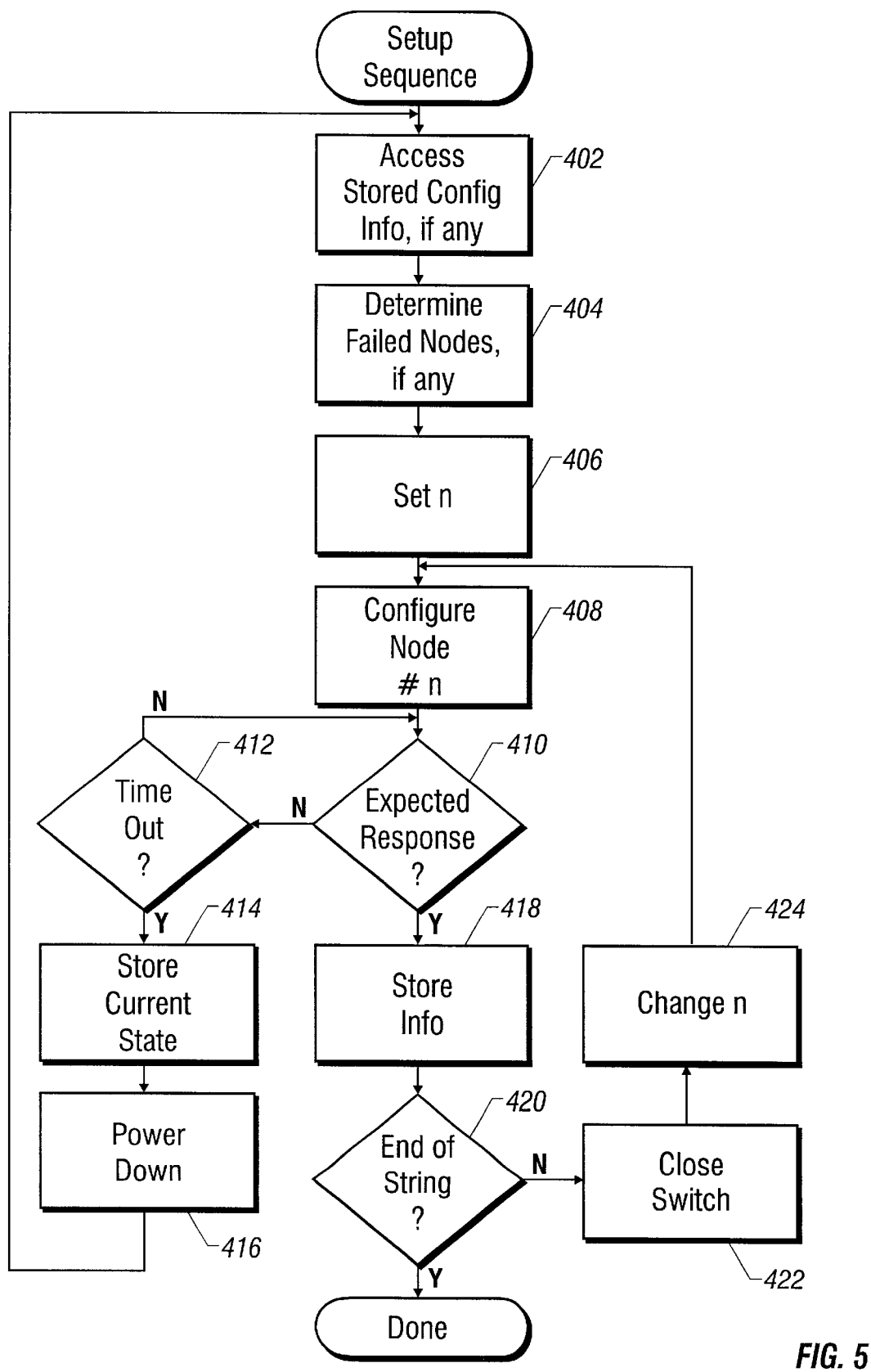
FIG. 5 is a flow diagram of a setup sequence to set up nodes in the communications system of FIG. 3.

Referring further to FIG. 5, a setup sequence for testing the integrity of components in the communications system according to one embodiment may be executed by a setup module 300, which may be implemented as software or firmware layers in the surface node 200. In the surface node 200, as shown in FIG. 4, the setup module 300 may be executable on a central processing unit (CPU) 362. The CPU 362 may be coupled to system memory 364 as well as to other storage devices, including a hard disk drive 366 or a floppy disk drive 368. Other storage media that may be located in the surface node 200 includes compact disc (CD) or digital video disc (DVD) drives and non-volatile memories. The setup module 300 may initially be stored as instructions on the various machine-readable storage media, including the hard disk drive, floppy drive, CD or DVD drive, non-volatile memory, main memory, or other media. The instructions when executed cause the surface node 200 to perform the setup sequence according to an embodiment.

A modem 370 is also included in the surface node that may be coupled to the communications link 21. The modem 370 includes a transmitter to transmit signals down the link 20 and a receiver to receive signals from the link 21.

If all nodes and channels downhole are operational, then the setup sequence would successfully initialize all nodes downhole, including assignment of addresses and transfer of initialization information. If any of the nodes or channels are defective, then the setup module 300 would not be able to receive an expected response from a downhole node. If a defective component is detected, the setup module 300 will attempt to find an alternate route to the downhole nodes.

In one embodiment, if an expected response is not received within a predetermined amount of time, the setup module 300 times out and powers the entire system down to open all isolation switches. Before powering down, the setup module 300 stores in memory (e.g., hard disk drive, non-volatile memory, system memory, and so forth) the state of the setup sequence, including which devices have been successfully set up.

The setup module 300 first accesses (at 402) any stored setup information from previous setup cycles. For example, if a previous setup cycle was interrupted due to a defective node or channel downhole, then the state of that setup sequence was stored in a storage location in the surface node 200. From the stored information, if it exists, the setup module can determine (at 404) which nodes or channels have been detected to be defective. Based on which devices have already been initialized, a parameter n is set (at 406) to the next value. If this is the first time through the setup sequence, the parameter n is set to 1, for example. It is contemplated, however, that a different setup sequence may be used.

Next, the setup module configures (at 408) node #n, such as by assigning an address to the node, setting the internal context and register settings of the node, and so forth. The setup module may perform this by transmitting a configuration cycle downhole to node #n. The setup module 300 next waits for an expected response (at 410) from node #n. An expected response, by way of example, may include the assigned address information along with other types of information (e.g., device name, serial number, and the like). If the expected response has not been received (at 410), then the set-module 300 determines (at 412) if a time out has occurred. If not, then the setup module 300 continues to wait for the response from node #n. However, if a predetermined amount of time has elapsed with no response from node #n, then time out occurs and the setup module 300 stores the current state of the setup sequence (at 414). The stored configuration information is accessed by the setup module 300 in the next setup sequence so that the module 300 may be made aware of which node or channel may be associated with the failure. Next, the setup module 300 powers down the system to open any switches that may have been closed as part of the setup sequence.

If, however, the downhole node returns with the expected response (at 410), the setup module 300 next stores the configuration information in a storage location in the surface node 10. Next, the setup module 300 determines (at 420) if the end of string has been reached. If so, then the setup sequence is completed. If not, then the switch in node #n is closed to allow access to the next node. The switch may be closed by issuing a command from the setup module 300 to the control unit in node #n. In response, the control unit issues the appropriate signal to close the switch. Next, the software module 300 changes (at 424) the value of the parameter n and proceeds to configure the next node.

In this manner, the nodes downhole are successively configured and set up. If any one of the devices or channels downhole is defective, the setup module 300 attempts to find an alternate path around the defective node or channel. For example, referring again to FIG. 3, if after node #1 has been configured and it is determined that node #2 is defective, the system is powered down to open all switches. In the next setup sequence, the setup module 300 continues the setup sequence by starting with node #5, for example, to bypass the defective node #2. The next node that may be configured may be node #4, followed by node #3. In this example, the switches in the nodes coupling channels 246, 248, and 250 may be closed while the switches coupling channels 240, 242 and 242, 244 remain open to isolate defective node #2.

Thus, a communications system having redundant channels has been described that can withstand some failures of communications link portions as well as nodes coupled to the communications link. If a channel or node failure is detected, an alternate communications path around the defective part may be used. At initialization, a setup module determines which channels or nodes have failed and maintains isolation switches in the open position to isolate the defective parts.

In further embodiments, to improve performance and reliability of a communications link, distortions caused by portions of the link may be determined and compensated for during signal transmission. The length of the link may be very long, ranging between thousands of feet to tens of thousands of feet. Because of such lengths, the link may cause distortions in transmitted signals that may reduce the reliability of communications if compensation is not provided for such distortions.

Training sequences may be performed with the downhole nodes, from which the transfer characteristics of different communications link portions may be determined. Once the transfer characteristics are known, adaptive equalization may be performed to compensate for signal distortions. Training sequences may be performed at periodic intervals or in response to certain events, for example, system initialization or detection of changes in environment or noise. During the training sequence, one node may transmit a known signal stream (the training stream) from one node to a receiver in another node, which may compare the received stream to an expected result. Distortions caused by corresponding communications link portions are detected based on this comparison, from which the transfer characteristics of the link portions may be determined or estimated. The derived or estimated transfer characteristics may be represented by inverse transfer functions $H^{-1}$ of the communications link portions.

From the transfer characteristics of the link portions, adaptive equalization may be performed either at the transmitter or receiver end in communications between nodes coupled to the link. Given a signal S and a link portion having a transfer function H, distortion caused by the link portion results in a distorted signal S*H sent from one node to another. During the training sequence, the inverse transfer function $H^{-1}$ is derived and stored as an equalization parameter to be applied to distorted signals over the link portions. According to one embodiment, to compensate for the distortion caused by the link portion, a pre-distorted signal generated in the transmitter, expressed as $S*H^{-1}$, may be transmitted over the link portion to a receiver that receives the signal as the original signal S. Once this pre-distorted signal is sent over the link portion that has the transfer function H, the resultant signal $S*H^{-1}*H$ converts back to the signal S, which is the originally intended signal. The pre-distortion using $H^{-1}$ may adjust the gain and phase of the transmitted signal. In an alternative embodiment, compensation may be performed at the receiver end by applying the inverse transfer function $H^{-1}$ to the received signal S*H to cancel out the distortion caused by the communications link portion.

Figure 6:
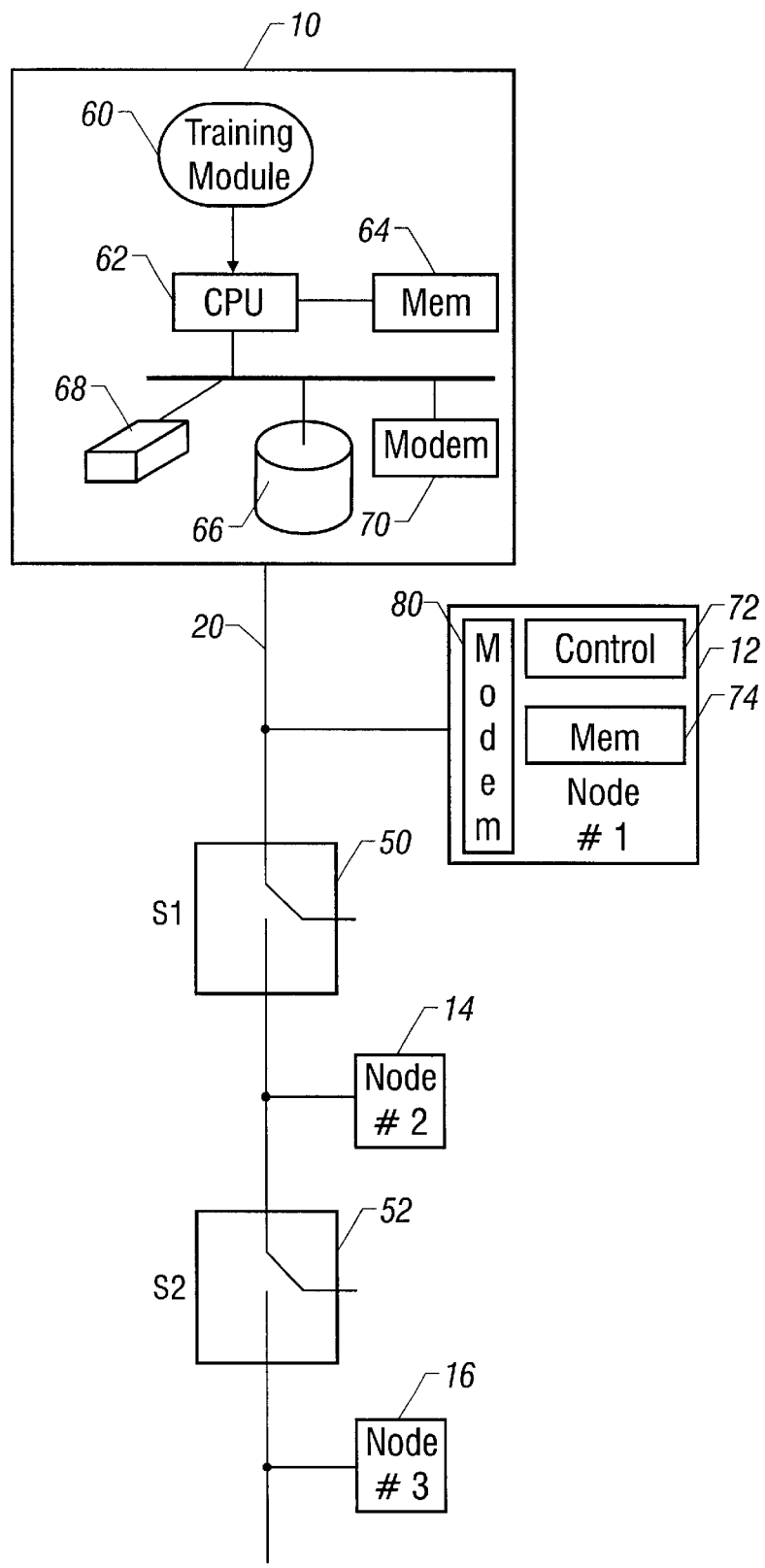
FIG. 6 is a diagram illustrating how nodes in a communications system may be coupled to the communications link.

Referring to FIG. 6, nodes 12, 14, and 16 are coupled at different depths to a communications link 20. Distortion caused by the different portions of the communications link 20 coupled to corresponding nodes 12, 14, and 16 are different. In one embodiment, the transfer characteristics of the link portions between the surface node 10 and each of the downhole nodes 12, 14, and 16 may be defined. In further embodiments, the transfer characteristics between or among each of the downhole nodes 12, 14, and 16 may also be defined, which may be advantageous for systems in which the downhole nodes may need to communicate directly to each other over the communications link 20.

In the illustrated embodiment, the transfer function representing the transfer characteristic of the link 20 portion between the surface node 10 and the first node 12 is defined as H1. Similarly, the transfer functions characterizing the link 20 portions between the surface node 10 and the second and third nodes 14 and 16 in the illustrated embodiment are defined as H2 and H3, respectively. With additional downhole nodes coupled to the link 20 in the wellbore 18, additional transfer functions Hn may be defined for the respective lengths of the link 20 between the surface node 10 and the downhole nodes.

In one embodiment, the inverse transfer functions $Hn^{-1}$ are calculated and applied as equalization parameters used for adaptive equalization. To determine the inverse transfer functions $Hn^{-1}$, training sequences may be performed between a surface node 10 and each of the downhole nodes 12, 14, and 16 (nodes #1, #2, and #3). In further embodiments, training sequences may also be performed between or among downhole nodes to determine transfer characteristics of the portions of the link 20 coupling the downhole nodes.

The derived inverse transfer functions $Hn^{-1}$ may be stored in the surface node 10, and in some embodiments, also in each of the corresponding downhole nodes 12, 14, and 16. Thus, for example, when the surface node 10 wishes to communicate with a downhole node #n, its transmitter may fetch from a storage location in the surface node the parameter $Hn^{-1}$. If a downhole node #n wishes to communicate with the surface node 10, a transmitter in the downhole node, according to one embodiment, may fetch from its memory the parameter $Hn^{-}$ to combine with the signal to be transmitted to the surface. In an alternative embodiment, the downhole node may transmit the signal without pre-distortion and the surface node 10 is responsible for compensation of signal distortion received over the link 20.

According to one embodiment, the training sequence is performed on each node downhole one at a time to determine its corresponding inverse transfer function $Hn^{-1}$. To do so, switches S1 and S2 are coupled between successive nodes 12, 14, and 16. As the communications link 20 is configured to provide both power and signals, the switches S1 and S2 control communication of both power and data. According to one embodiment, the training sequence is performed as each downhole node is initially powered up.

The training sequence starts with node 12, followed by node 14, and then node 16. When the training sequence is performed on node #1, the switch S1 is in the open position. At this time, node #1 is powered on but power is cut off from downstream nodes since switch S1 is open. To train node #2, the switch S1 is placed in the closed position, but the switch S2 is open. To train node #3, both switches S1 and S2 are placed in closed positions to allow power to reach node #3. Before each training sequence, the system is powered down, which causes switches S1 and S2 to open. The surface node 10 then powers up the first node #1, followed by successively closing switches S1 and S2 to power up nodes #2 and #3 to perform the training sequence. Additional switches may be placed along the link 20 as more downhole nodes are coupled to the link 20. As examples, the switches may be implemented as relay switches, solid-state switches, or other types of switches as conventionally available.

In one embodiment, the equalization parameters $Hn^{-1}$ are all stored in the surface node 10, which are accessible by the receiver in the surface node 10 to apply to distorted signals $S*Hn^{-1}$ received from respective link portions. In this embodiment, a transmitter in the surface node 10 is also capable of selecting one of multiple parameters $Hn^{-1}$ to perform adaptive equalization of signals transmitted downhole. In alternative embodiments, the equalization parameters $Hn^{-1}$ may also be stored in corresponding downhole nodes #n so that transmitters in the downhole nodes may apply the parameter $Hn^{-1}$ to a transmitted signal S. Due to harsh conditions downhole, the processing capabilities that may be included in each downhole node may be limited. As a result, it may be more cost effective and practical to perform adaptive equalization in the surface node 10.

Figure 7:
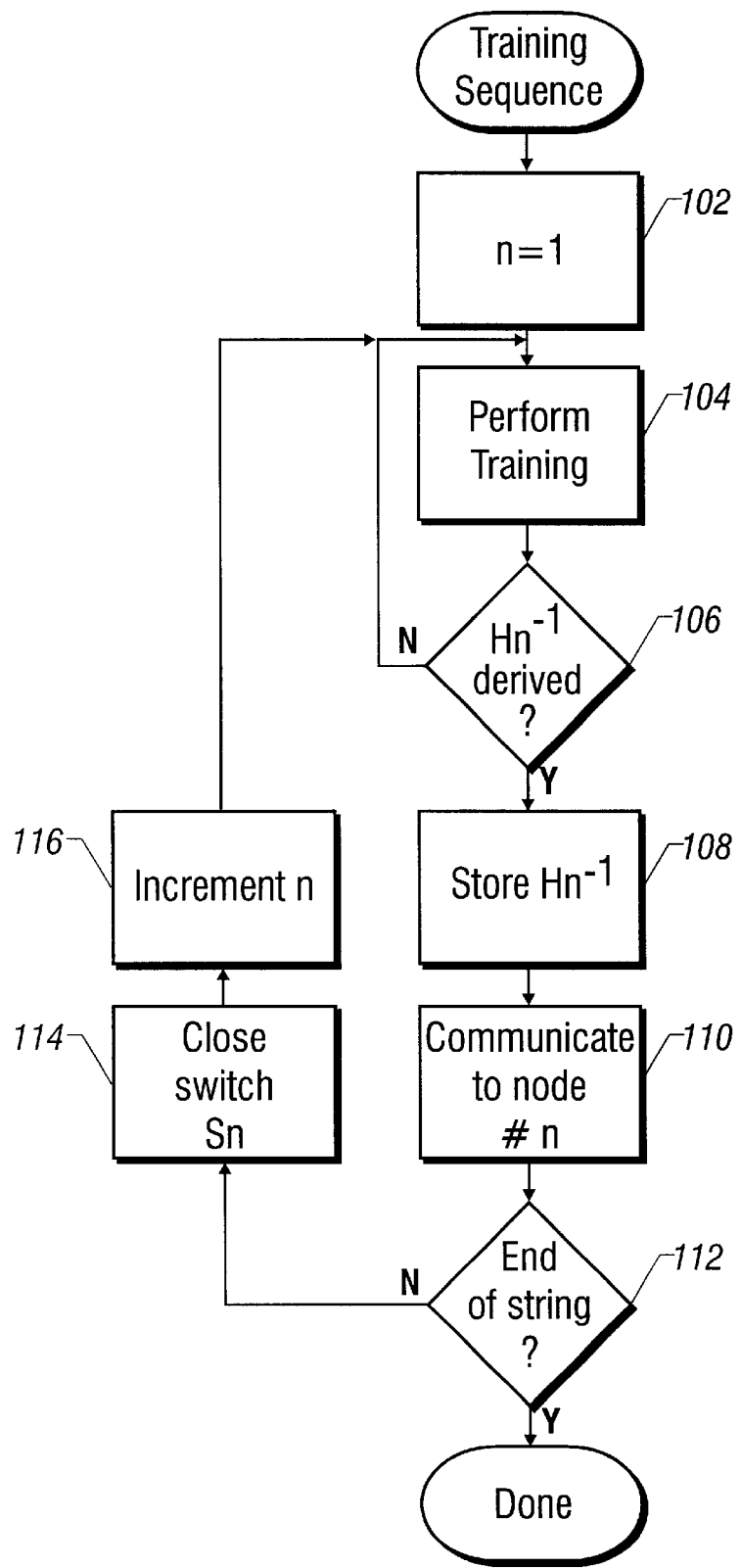
FIG. 7 is a flow diagram of a training sequence performed in the system of FIG. 6.

Referring further to FIG. 7, a flow diagram of a training sequence according to one embodiment is illustrated. The training sequence may be implementable by a training module 60 executable in the surface node 10, which may include a data acquisition system that may be implemented with a computer or any other controller-based system in which the controller may be a microprocessor, microcontroller, ASIC, PGA, discrete devices, or the like. The training module 60 may be implementable in one or more layers in the surface node 10 (e.g., application layer, operating system layer, device driver layer, firmware layer, and so forth) and in one or more sub-modules. The surface node 10 may include a CPU 62 and storage media 64, 66, 68, and other storage devices similar to those described in surface node 300 (FIG. 4). A modem 70 is also included in the surface node that may be coupled to the communications link 20. The modem 70 includes a transmitter to transmit signals down the link 20 and a receiver to receive signals from the link 20.

Each downhole node #n may include a control device (e.g., a microcontroller, ASIC, PGA, or discrete devices) that is capable of responding to requests from the surface node 10 or other downhole nodes. In some embodiments, the control device may also be capable of generating commands for transmitting over the link 20 to other nodes. Each node #n also includes a storage device 74 (e.g., registers, non-volatile memory, random access memory, and so forth) and a modem 80 having a transmitter and receiver coupled to the communications link 20 to transmit and receive commands or responses.

A training sequence may be performed by the training module 60 at system start-up, at periodic intervals, or in response to certain stimuli, including for example operator input, change of downhole conditions, or noise. The surface node 10 may power off the communications link 20 to open switches S1 and S2 before powering on the link 20 to perform the training sequence. To begin the training sequence according to one embodiment, the training module 60 may initialize (at 102) a parameter n to the value one. This begins the training sequence of the communications link portion between the surface node 10 and downhole node #1. In alternative embodiments, the training sequence may occur in a different sequence from that illustrated in FIG. 7.

Next, the training module 60 performs (at 104) the training operation with node #n. The training operation according to one embodiment includes the downhole node #n transmitting a known training pattern stream to the surface node 10. The training module 60 then compares the received training pattern to an expected pattern. From the comparison, the inverse transfer function $Hn^{-1}$ of the link portion may be derived. The training module 60 then determines (at 106) if the inverse transfer function $Hn^{-1}$ has been successfully derived. If not, the training operation is continued (at 104). If the inverse transfer function $Hn^{-1}$ for node #n has been successively derived, then the training module 60 stores (at 108) the inverse transfer function $Hn^{-1}$ in a storage location in the surface node 10. Next, according to one embodiment, the training module 60 may communicate (at 110) to the downhole node #n the inverse transfer function $Hn^{-1}$ so that the downhole node #n may store $Hn^{-1}$ in its storage location. Next, the training module 60 determines if the end of the string has been reached (at 112). If so, the training sequence is completed.

However, if more nodes need to be trained, then the switch Sn that is below the previously training node #n is closed (at 114). The switch Sn may be controllable by node #n in response to a command issued by the training module 60. For example, a control signal may be coupled from node #n to switch Sn to actuate the switch Sn to the open or close position. Next, the parameter n is incremented (at 116) to begin the training operation of the next downhole node. The acts performed at 104–116 are repeated until all nodes downhole have been trained.

A further feature of the switches S1 and S2 is that, if a node failure occurs, the switches S1 and S2 allow downstream nodes to be "dropped out" so that nodes above the failed node can still work but communication to downstream nodes is lost. For example, referring again to FIG. 6, if node #3 is a shorted node, then closing the switch S2 during the training sequence will cause other nodes coupled to the link 20 to fail. This may be detected by the software module 60 when nodes do not respond to commands or queries within time-out periods. If that occurs, then the surface node 10 powers the communications link 20 down to again open the switches S1 and S2. The subsequent training sequence will then stop before closing switch S2. Although node #3 and any other nodes coupled below node #3 cannot be used, nodes #1 and #2 can still be used to provide a partially functional system.

In further embodiments, redundancy may be provided in the communications link 20 so that failed nodes or link portions may be bypassed to reach other nodes. This is described above in connection with FIGS. 2A–2B and 3–5.

Figure 8:
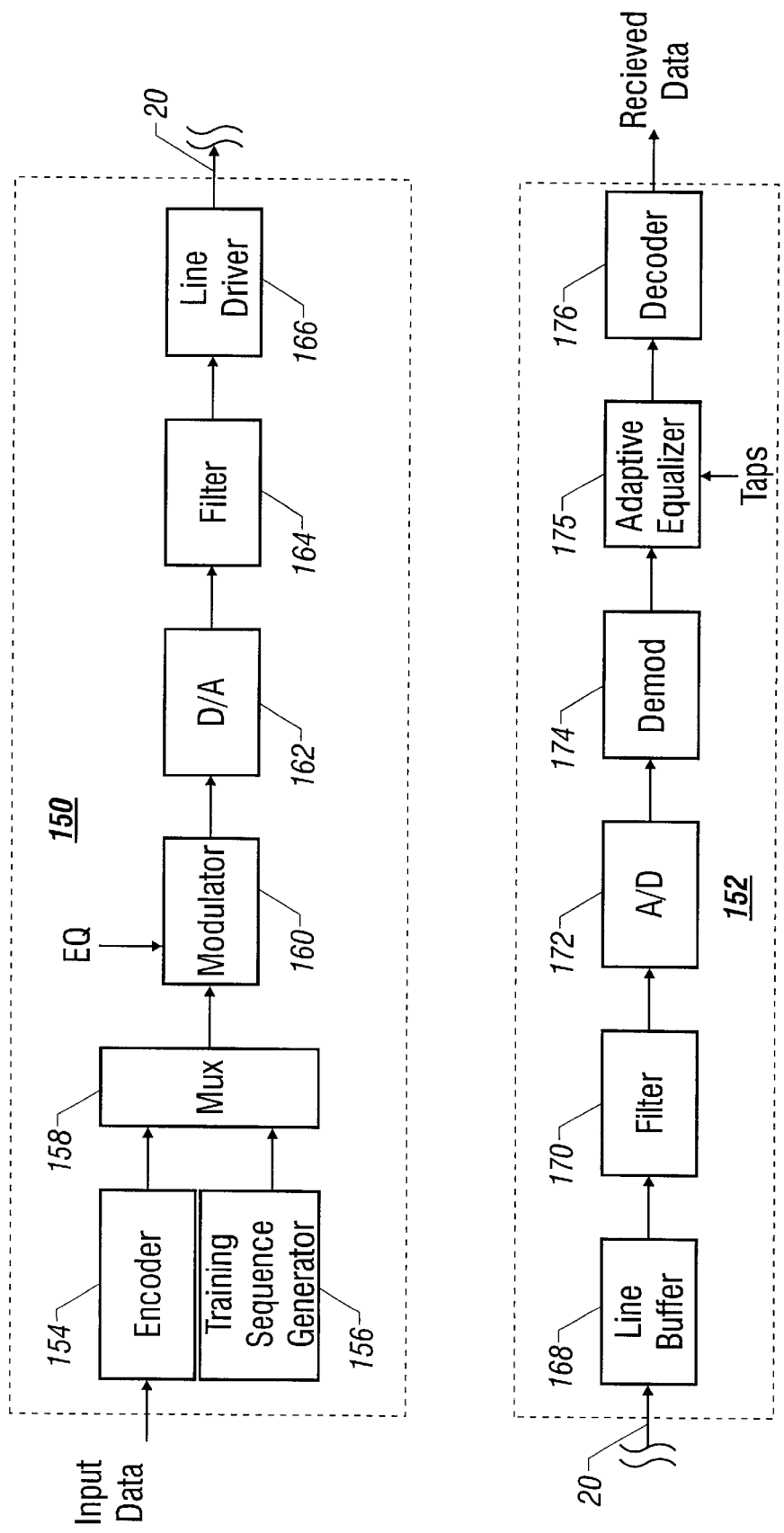
FIG. 8 is a block diagram of a transmitter and receiver in nodes coupled to the communications link of FIG. 6.

Referring to FIG. 8, the modems 70 and 80 of the surface node 10 and downhole nodes, respectively, according to one embodiment may include transmitter and receiver portions. For illustrative purposes, a transmitter 150 of a downhole node modem 80 is illustrated in conjunction with a receiver 152 of the surface node modem 70. The transmitter 150 in one example configuration may include an encoder 154 that receives input data for transmission. The output of the encoder 154 is provided to the input of a multiplexer 158, which has another input coupled to a training sequence generator 156. The multiplexer 158 selects the output of one of the encoder 154 and training sequence generator 156 and provides it to the input of a modulator 160 to modulate a carrier waveform with the baseband transmission signal.

In one embodiment, pre-distortion of the signal to be transmitted may be performed in the modulator by feeding one or more control signals EQ that are based on the equalization parameter $Hn^{-1}$. Alternatively, a digital filter stage may be coupled before the modulator 160 that is controllable by an equalization parameter $Hn^{-1}$ to perform the pre-distortion. Equalization may also be performed in other components in further embodiments. The digital output of the modulator 160 is converted to analog format by a digital-to-analog (D/A) converter 162. The output analog signal may be provided through a filter stage 164 and a line driver 166 that drives the link 20.

On the receive side, the analog signal transmitted over the link 20 may be received by a line buffer 168 in the receiver 152, which is then passed through an input filter stage 170 and converted to digital format by an analog-to-digital (A/D) converter 172. The digital stream is then fed to a demodulator 174 that recovers the baseband signal. In an embodiment in which signals transmitted from transmitters downhole are not pre-distorted, the output of the demodulator 174 may be provided to an adaptive equalizer 175 that is configured to compensate for the distortion caused by the communications link portion over which a received signal is sent. The adaptive equalizer 175 receives taps that are derived from an appropriate one of the equalization parameters $Hn^{-1}$ stored in the surface node 10. For example, when a signal stream is received, an identifier (such as an address) may be provided to select an appropriate parameter $Hn^{-1}$. The output from the adaptive equalizer 175 (or the output from the demodulator 174 if the adaptive equalizer 175 is not present) is provided to a decoder 176 which may regenerate the transmitted data for processing by the CPU 62 in the surface node 00.

In the transmitter 150, the training sequence generator 156 can generate training patterns and synchronization patterns for transmission over the link 20. Synchronization patterns may be generated to allow the receiver 152 in the surface node 10 to reacquire the carrier frequency and phase. During a training sequence, known training patterns are generated by the training sequence generator 156 in each of the downhole nodes and received by the surface node 10. For example, a transmitter 150 in a downhole node may store the training pattern in non-volatile memory so that the transmitter 150 may start up by transmitting the known training pattern. The surface node 10 may also store a copy of the training pattern so that the training module 60 may compare the received pattern with the expected pattern. Differences between the patterns may be caused by distortions of the link 20. From the comparison, the transfer function Hn may be derived and the inverse $Hn^{-1}$ is stored and transmitted to each of the downhole nodes for storage. $Hn^{-1}$ may then be used by transmitters in each of modems 70 and 80 to pre-distort signals transmitted over the link 20 in some embodiments.

In further embodiments, some of the downhole nodes may also be capable of performing training sequences. These downhole nodes may cause another node to transmit a training pattern so that the transfer characteristics of the communication link portions between the nodes may be determined.

According to one embodiment, the transmitter in the surface node modem 70 is capable of accessing multiple equalization parameters $Hn^{-1}$ stored in a memory location in the surface node 10 so that the appropriate one is selected "on the fly" for communication with one of the downhole nodes. In further embodiments, each of the downhole nodes may also be capable of storing multiple equalization parameters to allow them to communicate over the link 20 with the surface node 10 as well as other downhole nodes.

A communications system for use in a well has thus been described in which distortions of communications link portions between or among multiple nodes are detected. Transfer characteristics of the communications link portions are derived from which equalization parameters can be determined and stored. According to one embodiment, using the equalization parameters, transmitters in the nodes can perform adaptive equalization by pre-distorting signals that are transmitted from one node to another such that the distortion of a communications link portion may be substantially canceled out. In other embodiments, receivers in some nodes may perform adaptive equalization of received signals. Multiple downhole nodes may be successively trained to enable performance of adaptive equalization of signals sent between one of multiple downhole nodes and the surface node.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A system for use in a well having completion zones, comprising:
   a surface node;
   a plurality of downhole nodes positioned in the completion zones; and
   a communications link extending into the well and coupled to the surface node and downhole nodes, the communications link including channels coupling successive nodes, the surface node and downhole nodes coupled in a loop by the channels.

2. The system of claim 1, wherein the downhole nodes are positioned in the well in a first sequence, and wherein the downhole nodes are coupled to the communications link in a second sequence different from the first sequence.

3. The system of claim 2, comprising first, second, and third nodes positioned in the well, wherein a channel of the communications link bypasses the second node to couple the first and third nodes.

4. The system of claim 2, wherein channels of the communications link bypasses at least an intermediate node in a sequence of nodes to couple nodes on either side of the intermediate node.

5. The system of claim 1, further comprising a software module executable in the surface node to detect a defective channel or downhole node.

6. The system of claim 5, further comprising isolation switches coupled to the communications link, the software module executable to further actuate one or more isolation switches to an open position to isolate the defective channel or downhole node.

7. The system of claim 6, wherein the isolation switches power up in the open position, the software module actuating the one or more isolation switches by maintaining them open.

8. The system of claim 6, wherein the software module is further executable to actuate the isolation switches to close positions to couple non-defective channels and downhole nodes.

9. The system of claim 8, wherein each downhole node includes a control device responsive to communications from the software module to actuate a corresponding isolation switch.

10. A method of setting up a communications system in a well having downhole nodes coupled by a communications link, comprising:
    determining if a downhole node failure exists; and
    identifying an alternate route in the communications link around the failed downhole node; and
    actuating one or more isolation switches to isolate the failed node.

11. The method of claim 10, further comprising:
    determining if a failure exists in a portion of the communications link exists; and
    identifying an alternate route in the communications link around the failed communications link portion.

12. The method of claim 10, further comprising successively initializing the downhole nodes, wherein a failed downhole node is detected if no response is received from the downhole node within a predetermined amount of time after an access by a surface node.

13. The method of claim 12, further comprising powering down the communications system if a failed node is detected to open the isolation switches.

14. The method of claim 13, further comprising maintaining one or more isolation switches open to isolate the failed node.

15. The method of claim 12, further comprising storing status information indicating which nodes are failed and which are not before powering down.

16. The method of claim 10, further comprising testing the downhole nodes and initializing downhole nodes passing the test.

17. The method of claim 16, wherein initializing the downhole nodes comprises assigning addresses to the downhole nodes.

18. The method of claim 10, further comprising:
    positioning the downhole nodes in a first sequence in the well; and
    coupling the downhole nodes to the communications link in a sequence different than the first sequence.

19. An article including a machine-readable storage medium containing instructions that when executed cause a controller in a communications system in a well having downhole nodes coupled by a communications link to:

determine if a downhole node failure exists; and identify an alternate route in the communications link around the failed downhole node.

20. The article of claim 19, wherein the storage medium contains instructions for causing the controller to further actuate one or more isolation switches to isolate the failed downhole node.

21. The article of claim 19, wherein the storage medium contains instructions for causing the controller to further:

determine if a failure in a portion of the communications link exists; and identify an alternate route in the communications link around the failed communications link portion.

22. The article of claim 19, wherein the storage medium contains instructions for causing the controller to further successively initialize the downhole nodes, wherein a failed downhole node is detected if no response is received from the downhole node within a predetermined amount of time after an access by a surface node.

23. A system for use with a well, comprising:

a controller;

a plurality of nodes in the well; and a communications link coupled to the plurality of nodes, the controller adapted to perform a test procedure to detect for failed one or more nodes, the controller adapted to isolate the failed one or more nodes, wherein the plurality of nodes are arranged in a first order in the well, and the plurality of nodes are coupled to the communications link in a second order different than the first order.

24. The system of claim 23, further comprising isolation switches associated with the nodes, the controller adapted to actuate the isolation switches to isolate failed one or more nodes.

25. The system of claim 23, wherein the controller is adapted to initialize nodes passing the test procedure.

26. The system of claim 25, wherein the controller is adapted to assign addresses to the nodes to initialize the nodes.

* * * * *